(12) United States Patent
Nevou et al.

(10) Patent No.: US 11,921,956 B2
(45) Date of Patent: Mar. 5, 2024

(54) OPTICAL DISTANCE SENSING USING A TARGET SURFACE HAVING A NON-UNIFORM DESIGN OF REGIONS OF DIFFERENT REFLECTIVITY

(71) Applicant: ams Sensors Singapore Pte. Ltd., Singapore (SG)

(72) Inventors: Laurent Nevou, Zurich (CH); Jens Geiger, Thalwil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 262 days.

(21) Appl. No.: 17/311,511

(22) PCT Filed: Dec. 9, 2019

(86) PCT No.: PCT/SG2019/050605
§ 371 (c)(1),
(2) Date: Jun. 7, 2021

(87) PCT Pub. No.: WO2020/130938
PCT Pub. Date: Jun. 25, 2020

(65) Prior Publication Data
US 2022/0035478 A1 Feb. 3, 2022

Related U.S. Application Data

(60) Provisional application No. 62/783,705, filed on Dec. 21, 2018.

(51) Int. Cl.
*G06F 3/042* (2006.01)
*G01B 11/02* (2006.01)
(Continued)

(52) U.S. Cl.
CPC .......... *G06F 3/0421* (2013.01); *G01B 11/026* (2013.01); *G01S 7/4808* (2013.01); *G01S 17/08* (2013.01); *G06F 3/0412* (2013.01)

(58) Field of Classification Search
CPC .... G06F 3/0421; G06F 3/0412; G01S 7/4808; G01S 17/08; G01B 11/026
See application file for complete search history.

(56) References Cited

U.S. PATENT DOCUMENTS

2008/0265136 A1* 10/2008 Tanaka ............... G01D 5/34746
250/206.1
2012/0071206 A1 3/2012 Pemberton-Pigott
(Continued)

FOREIGN PATENT DOCUMENTS

CN 102565803 A 7/2012
CN 105607775 A 5/2016
(Continued)

OTHER PUBLICATIONS

International Search Report and Written Opinion for Application No. PCT/SG2019/050605 dated Feb. 12, 2020 (16 pages).
(Continued)

*Primary Examiner* — Jennifer D Bennett
*Assistant Examiner* — Erin R Garber
(74) *Attorney, Agent, or Firm* — Michael Best & Friedrich LLP (57) ABSTRACT

An apparatus, e.g. a proximity sensor module (10), for optical distance sensing includes a target surface (25) having a non-uniform design including a high-reflectivity region and a low-reflectivity region for light of a particular wavelength. The position of the target surface (25) is displaceable within the apparatus. The apparatus includes a light source (12) operable to emit light at the particular wavelength toward the target surface (25), and a photodetector (14) operable to sense at least some of the light emitted by the light source and subsequently reflected by the target surface (25). A processor is operable to correlate an output from the
(Continued)

photodetector (14) with a distance to the target surface (25). A wall (22) may separate the light source (12) and photodetector (14) from one another, which can help reduce internal optical crosstalk. The light source (12) and photodetector (14) are mounted and electrically coupled to a substrate (16) that, in turn, can be mounted and electrically coupled to a printed circuit board (PCB) (18) of a host device. The light source (12) and photodetector (14) are surrounded laterally by a spacer or housing wall (20). The target surface (25) may be the backside of a touch interactive display screen (24) in the host device, e.g., a portable computing device such as a smartphone, tablet, wearable device, personal digital assistant (PDA), or personal computer. Circuitry (28) can be implemented, for example, as an integrated circuit chip or other processor and may include software and/or a look-up table stored in memory that allows the circuitry (28) to correlate the measured photodetector signal to a distance. When pressure is provided on the display screen (24) (e.g., by a person pressing her finger on the screen), the display screen is displaced slightly in the direction of the substrate (16) on which the light source (12) and photodetector (14) are mounted. As a result of the displacement, the intensity of light detected by the photodetector (24) changes. The signal measured by the photodetector (24) can be correlated to a distance value. If the distance value is within a specified range (or changes by at least a specified amount), for example, it can trigger some further action in the host device.

17 Claims, 6 Drawing Sheets

(51) Int. Cl.
*G01S 7/48* (2006.01)
*G01S 17/08* (2006.01)
*G06F 3/041* (2006.01)

(56) References Cited

U.S. PATENT DOCUMENTS

| | | | |
|---|---|---|---|
| 2012/0119091 A1* | 5/2012 | Hong | G01S 7/481 |
| | | | 250/349 |
| 2017/0108874 A1* | 4/2017 | Peters | H04N 7/18 |
| 2017/0205937 A1 | 7/2017 | Zhang et al. | |

FOREIGN PATENT DOCUMENTS

| | | |
|---|---|---|
| CN | 107580709 A | 1/2018 |
| WO | 02087278 A2 | 10/2002 |

OTHER PUBLICATIONS

Chinese Patent Office Action for Application No. 201980084970.5 dated for Sep. 5, 2023 (42 pages including English translation).

* cited by examiner

OPTICAL DISTANCE SENSING USING A TARGET SURFACE HAVING A NON-UNIFORM DESIGN OF REGIONS OF DIFFERENT REFLECTIVITY

TECHNICAL FIELD

This disclosure relates to optical distance sensing using a target surface having a non-uniform design of regions of different reflectivity.

BACKGROUND

Various types of optical devices are incorporated into a wide range of consumer and industrial products and systems. Proximity sensors, for example, can be used to detect the position or location of an object.

Optical proximity sensors can employ reflective techniques, for example, to detect the presence or absence of an object in the vicinity of the sensor. A typical technique is to use a light emitting diode (LED) and an optical detector configured in such a way that light emitted from the LED is reflected from an object back to the detector. The light source can be selected so that the light is suitable for detection by the light detector. Thus, for example, the light source can generate light of a frequency that the light detector is best able to detect and that is not likely to be generated by other nearby sources.

In some instances, proximity sensors also can be used to detect the distance to a target, for example, where the optical properties (e.g., diffusivity and reflectivity) of the target are known. The optical response curve for sensors using such targets, however, generally is inversely proportional to the square of the distance from the target to the detector. Thus, as the distance increases, the variation of the signal tends to become weaker, resulting in a decrease in the sensor's accuracy.

SUMMARY

The present disclosure describes optical distance sensing using a target surface having a non-uniform design of regions of different reflectivity.

For example, in one aspect, the disclosure describes an apparatus that includes a target surface having a non-uniform design including a high-reflectivity region and a low-reflectivity region for light of a particular wavelength. The position of the target surface is displaceable within the apparatus. The apparatus includes a light source operable to emit light at the particular wavelength toward the target surface, and a photodetector operable to sense at least some of the light emitted by the light source and subsequently reflected by the target surface. A processor is operable to correlate an output from the photodetector with a distance to the target surface.

The disclosure also describes a method including emitting light of a particular wavelength toward a target surface having a non-uniform design that includes a high-reflectivity region and a low-reflectivity region for light of the particular wavelength. The method further includes receiving in a photodetector at least some of the light that was emitted by the light source and subsequently reflected by the target surface, and correlating an output from the photodetector with a distance to the target surface.

Some implementations include one or more of the following features. For example, in some cases, the high-reflectivity region has a reflectivity R>90%, and the low-reflectivity region has a reflectivity R<10%. Thus, for some implementations, the high-reflectivity region may be white, and the low-reflectivity region may be black.

In some instances, the high-reflectivity region is at a center of the design and is surrounded by the low-reflectivity region. In other instances, the low-reflectivity region is at a center of the design and is surrounded by the high-reflectivity region.

In some cases, a response curve of the photodetector, for different distances to the target surface, is more linear than if the target surface had a uniform high- or low-reflectivity across the entirety of the target surface. Also, in some implementations, a response curve of the photodetector, for different distances to the target surface, has a steeper slope than if the target surface had a uniform high- or low-reflectivity across the entirety of the target surface.

In some implementations, the design includes at least one grey-scale region. The at least one grey-scale region can have a reflectivity R, for example, 10%<R<90%.

The high-reflectivity region can be at a center of the design and can surrounded by the low-reflectivity region. Further, in some instances, the at least one grey-scale region provides a transition from the high-reflectivity region to the low-reflectivity region. In other cases, the low-reflectivity region is at a center of the design and is surrounded by the high-reflectivity region. Further, in some instances, the at least one grey-scale region provides a transition from the low-reflectivity region to the high-reflectivity region. A response curve of the photodetector, for different distances to the target surface, can be more linear than if the target surface had a uniform high- or low-reflectivity across the entirety of the target surface. In some cases, a response curve of the photodetector, for different distances to the target surface, has a steeper slope than if the target surface had a uniform high- or low-reflectivity across the entirety of the target surface.

In some instances, the design is symmetrical about a center line, wherein the light source and the photodetector are symmetrically disposed with respect to the center line. The amount of light sensed by the photodetector depends, in some implementations, on an amount of displacement of the target surface.

The target surface ca be, for example, a backside of a touch interactive display screen.

The disclosure also describes a host device (e.g., a smartphone) that includes a touch interactive display screen having a backside surface that has a non-uniform design including a high-reflectivity region and a low-reflectivity region for light of a particular wavelength. A position of the backside surface is displaceable within the host device. The host device includes a light source operable to emit light at the particular wavelength toward the backside surface, a photodetector operable to sense at least some of the light emitted by the light source and subsequently reflected by the backside surface, and a processor operable to correlate an output from the photodetector with a distance to the backside surface.

Various advantages can be obtained in some implementations. For example, the non-uniform design presented by the target surface can be tailored to allow the photodetector response curve to be modified in a particular way. Thus, in some implementations, the non-uniform design presented by the target provides a photodetector response curve that is more linear, that fits a specified analog-to-digital (ADC) range, and/or that has a desired slope.

Other aspects, features and advantages will be readily apparent from the following detailed description, the accompanying drawings, and the claims.

DETAILED DESCRIPTION

Figure 1:
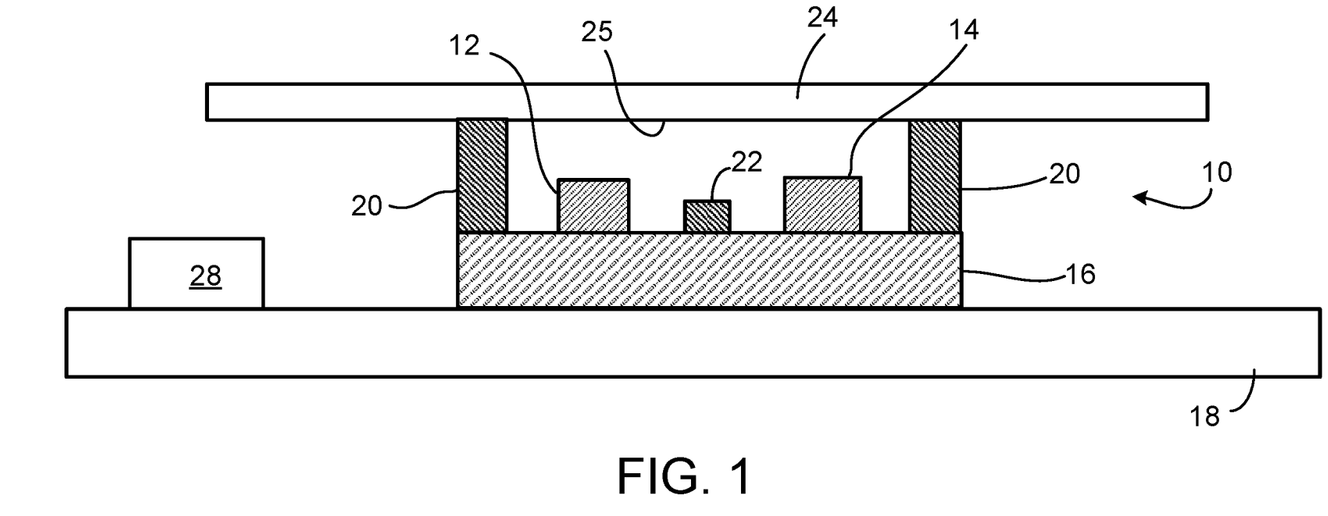
FIG. 1 illustrates an example of a proximity sensor.

As illustrated in FIG. 1, a proximity sensor module 10 includes a light source 12 operable to produce light source, and a photodetector 14 operable to sense light of a wavelength (e.g., infra-red (IR), near IR, visible or ultraviolet (UV)) produced by the light source 12. The light source 12 can be, for example, an LED, an OLED or a laser chip. The photodetector 14 can be, for example, a photodiode. The light source 12 and photodetector 14 can be implemented, for example, as integrated semiconductor dies. In some cases, the module includes passive optical components to redirect light by refraction and/or diffraction and/or reflection (e.g., a lens, a prism, a mirror). The light source 12 and photodetector 14 are mounted and electrically coupled to a substrate 16 that, in turn, can be mounted and electrically coupled to a printed circuit board (PCB) 18 of a host device (e.g., a portable computing device such as a smartphone, tablet, wearable device, personal digital assistant (PDA), or personal computer). The electrical connections may be include one or more of die pads, surface mount connections, wire bonds or solder balls, depending on the implementation.

In the illustrated example, the light source 12 and photodetector 14 are surrounded laterally by a spacer or housing wall 20 that, in some cases, is opaque to the wavelength(s) produced by the light source 12 and sensed by the photodetector 14. To achieve maximum sensitivity and detection range, a close distance between the light source 12 and the photodetector 14 can be important. For example, in some instances, the center-to-center distance between the light source 12 and the photodetector 14 is less than 1 mm. To avoid erroneous sensor response and a reduced dynamic range due to internal crosstalk, optical isolation can be provided by a separation wall 22. The wall 22 separates the light source 12 and photodetector 14 from one another, which can help reduce internal optical crosstalk.

The light source 12 is arranged to produce light that is emitted toward a target surface, which in the illustrated example is the backside 25 of a touch interactive display screen 24 in the host device. Some of the light reflected by the backside 25 of the display screen 24 is sensed by the photodetector 14. When pressure is provided on the display screen 24 (e.g., by a person pressing her finger on the screen), the display screen is displaced slightly in the direction of the substrate 16 on which the light source 12 and photodetector 14 are mounted. As a result of the displacement, the intensity of light detected by the photodetector 24 changes. The signal measured by the photodetector 24 can be correlated to a distance value. If the distance value is within a specified range (or changes by at least a specified amount), for example, it can trigger some further action in the host device.

The backside 25 of the interactive display screen 24 (i.e., the target) presents a non-uniform design composed of at least one low reflectivity (e.g., black) region having close to 0% reflectivity (e.g., R<10%) and at least one high reflectivity (e.g., white) region having close to 100% reflectivity (e.g., R>90%) for the wavelength of light emitted by the light source 12. In some cases, the non-uniform design includes one or more grey-scale regions, each of which has a respective reflectivity between that of the black and white regions (e.g., less than 90% and greater than 10%). Preferably, the non-uniform design of the target has an area at least as large as the area encompassed by the acceptance angle of the photodetector 24 for the maximum expected separation distance between the backside 25 of the interactive display screen 24 and the substrate 16.

The non-uniform design presented by the target can be tailored to allow the photodetector response curve to be modified in a particular way. For example, in some implementations, the non-uniform design presented by the target can be tailored to provide a photodetector response curve that is more linear, that fits a specified analog-to-digital (ADC) range, and/or that has a desired slope.

Figure 2:
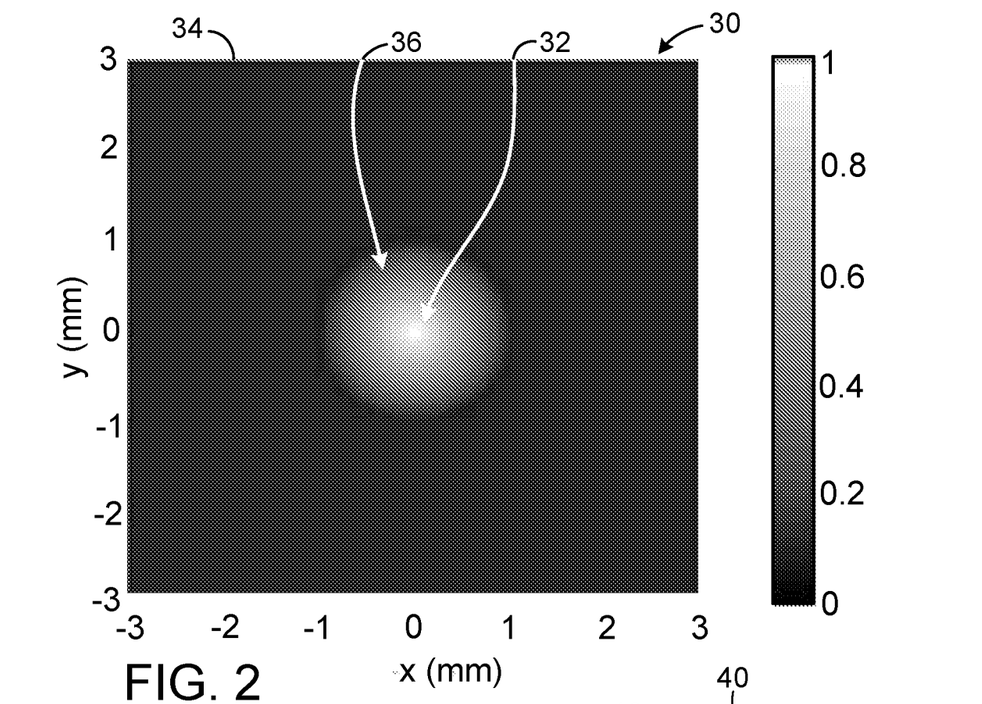
FIGS. 2 and 3 illustrate examples of targets presenting a non-uniform design.

FIG. 2 illustrates a first example of a non-uniform design 30 presented by the backside 25 of the interactive display screen 24 or other target. The design 30 includes a central circular white region 32 (i.e., close to 100% reflectivity)), an outer black region 34 (i.e., close to 0% reflectivity), and one or more grey-scale regions 36 each of which has a reflectivity less than that of the white region 32, but greater than that of the black region 34. In this example, the grey-scale regions 36 provide a transition in reflectivity from the inner white region 32 to the outer black region 34. Thus, the reflectivity transitions from about R>90% at the center of the design to about R<10% closer to the periphery. The design 30 faces the module 10 and can be disposed, for example, so as to be substantially symmetrical with respect to the center of the design 30 (i.e., (x, y)=(0, 0) in FIG. 2). The response curve can be adjusted by controlling the gradient (slope) of the grey scale between the black and white regions.

Figure 3:
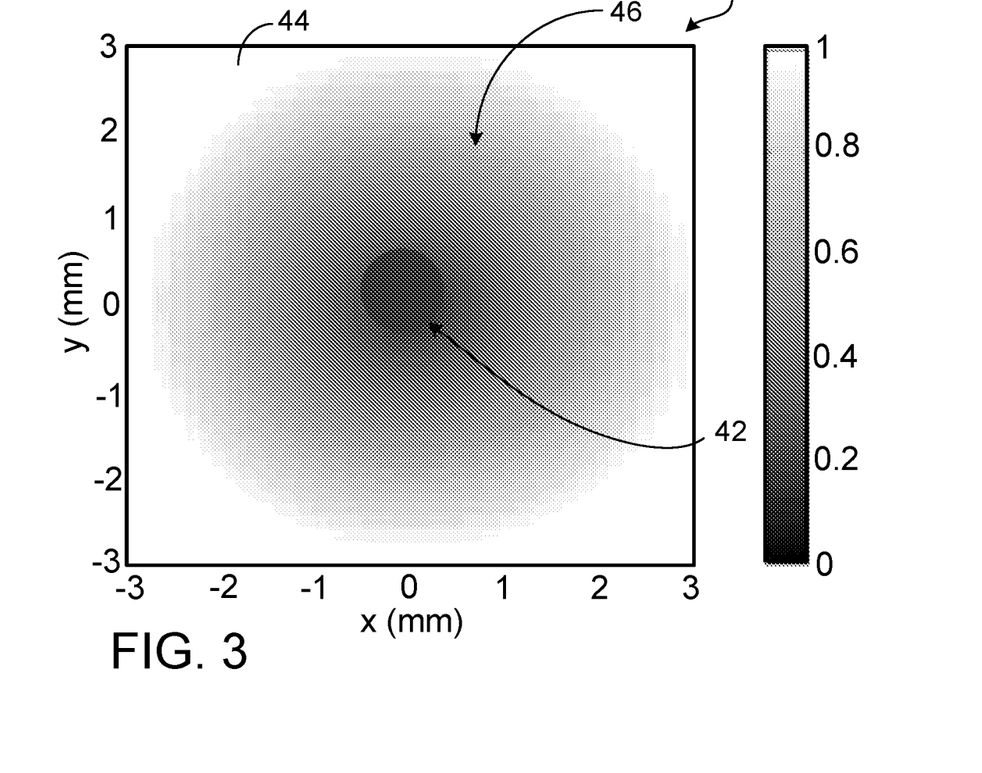

FIG. 3 illustrates a second example of a non-uniform design 40 presented by the backside 25 of the interactive display screen 24 or other target. The design 40 includes a central circular black region 42 (i.e., close to 0% reflectivity), an outer white region 44 (i.e., close to 100% reflectivity), and one or more grey-scale regions 46 each of which has a reflectivity less than that of the white region 44, but greater than that of the black region 42. In this example, the grey-scale regions 46 provide a transition in reflectivity from the inner black region 42 to the outer white region 44. Thus, the reflectivity transitions from about R<10% at the center of the design to about R>90% closer to the periphery. The design 40, which faces the module 10, can be disposed, for example, so as to be substantially symmetrical with respect to the center of the design 40 (i.e., (x, y)=(0, 0) in FIG. 3). The response curve can be adjusted by controlling the gradient (slope) of the grey scale between the black and white regions.

Figure 4:
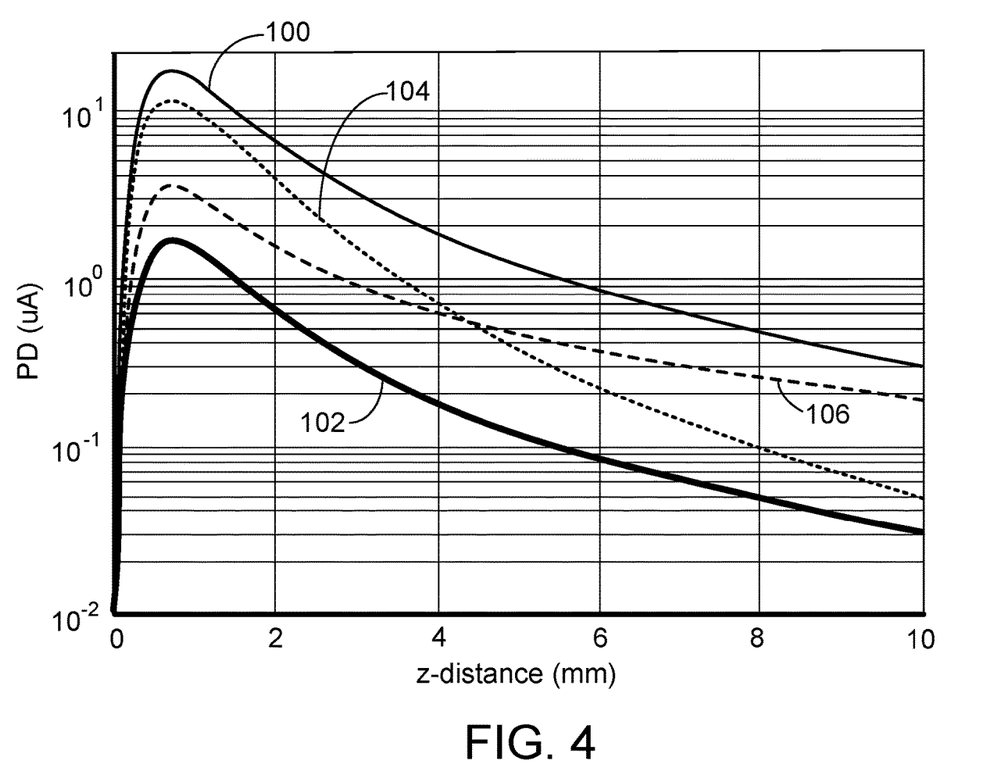
FIG. 4 illustrates response curves of a photodetector for various targets.

FIG. 4 illustrates computer simulated response curves of the photodetector 14 for a target having a uniform white design (i.e., R>90%) (curve 100) or a uniform black design (i.e., R<10%) (curve 102). The curves show how the photodetector current changes as a function of distance to the target changes.

FIG. 4 further illustrates simulated response curves of the photodetector 14 for a target having a non-uniform design as in FIG. 2 (curve 104) or a non-uniform design as in FIG. 3 (curve 106). These curves 104, 106 illustrate how the photodetector responsivity can be modified by providing a target having a non-uniform design. For example, the curve 104 indicates that the design 30 of FIG. 2 provides a steeper slope for the photodetector responsivity, which can help achieve more accurate measurements. On the other hand, the curve 106 indicates that the design 40 of FIG. 3 can help obtain a more linear responsivity, which may allow the module 10 to be used over a greater range of distances. In each case, the acceptance angle of the photodetector 14 and the distance to the target (e.g., the backside 25 of the display screen 24)—as well as the design presented by the target—impact the amount of light sensed by the photodetector 14.

Figure 5:
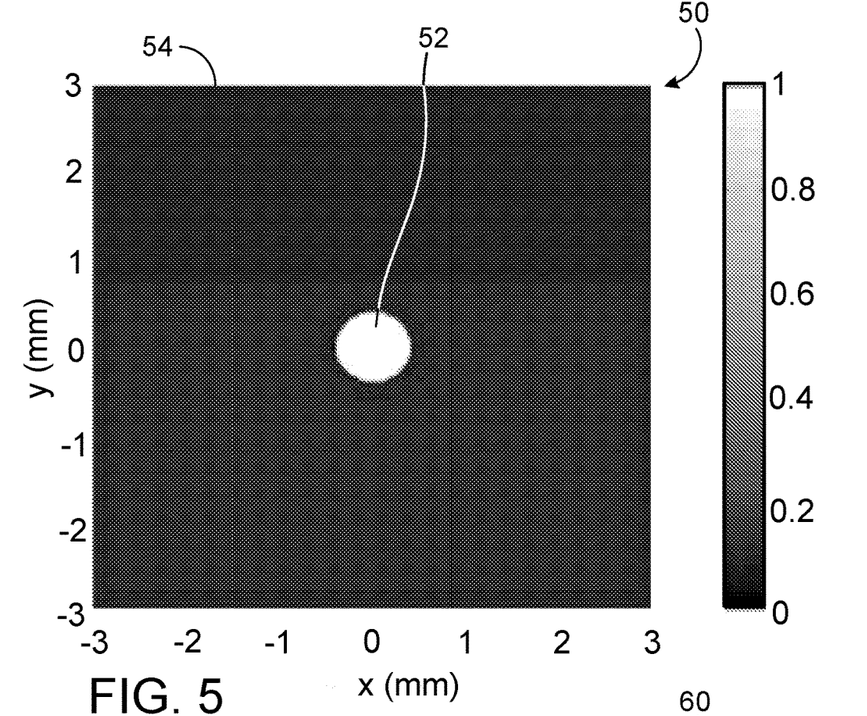
FIGS. 5 and 6 illustrate additional examples of targets presenting a non-uniform design.
Figure 6:
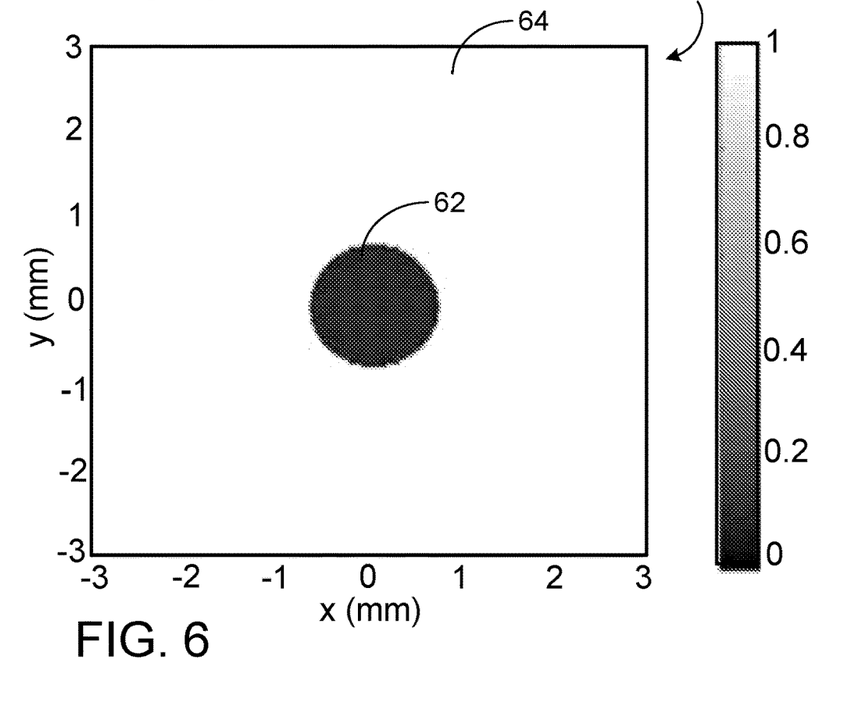

FIGS. 5 and 6 illustrate additional examples of non-uniform designs presented by the backside 25 of the interactive display screen 24 or other target. These examples, however, have a sharper transition between the black region (i.e., close to 0% reflectivity) and white region (i.e., close to 100% reflectivity). Thus, the examples of FIGS. 5 and 6 do not include a gradient to transition between the black and white regions of the design. Instead, the response curve can be tuned by adjusting the size (e.g., diameter) of the inner region.

In particular, FIG. 5 illustrates a third example of a non-uniform design 50 presented by the backside 25 of the interactive display screen 24 or other target. The design 50 includes a central circular white region 52 (i.e., close to 100% reflectivity)) surrounded by an outer black region 34 (i.e., close to 0% reflectivity. Thus, the reflectivity changes abruptly from about R>90% at the center of the design to about R<10% closer to the periphery. The design 50 faces the module 10 and can be disposed, for example, so as to be substantially symmetrical with respect to the center of the design 50 (i.e., (x, y)=(0, 0) in FIG. 5).

FIG. 6 illustrates a fourth example of a non-uniform design 60 presented by the backside 25 of the interactive display screen 24 or other target. The design 60 includes a central circular black region 62 (i.e., close to 0% reflectivity)) surrounded by an outer white region 64 (i.e., close to 100% reflectivity. Thus, the reflectivity changes abruptly from about R<10% at the center of the design to about R>90% closer to the periphery. The design 60 faces the module 10 and can be disposed, for example, so as to be substantially symmetrical with respect to the center of the design 60 (i.e., (x, y)=(0, 0) in FIG. 6).

Figure 7:
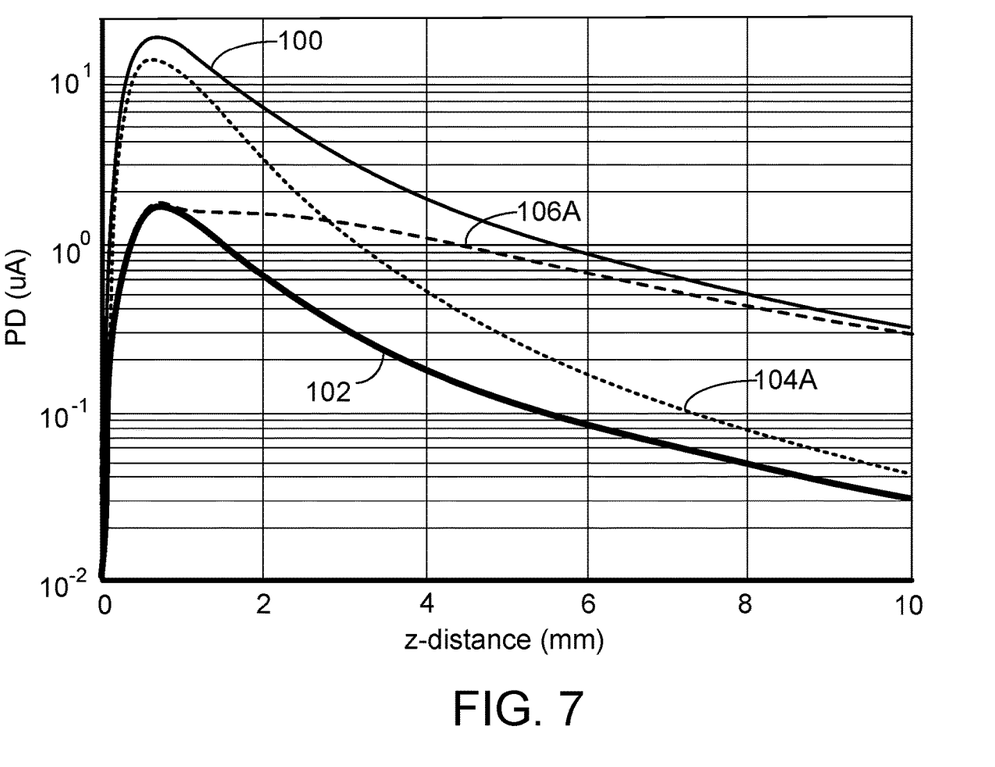
FIG. 7 illustrates response curves of a photodetector for various targets.

FIG. 7 illustrates the same computer simulated response curves of the photodetector 14 as in FIG. 4 for a target having a uniform white design (i.e., R>90%) (curve 100) or a uniform black design (i.e., R<10%) (curve 102). FIG. 7 further illustrates simulated response curves of the photodetector 14 for a target having a non-uniform design as in FIG. 5 (curve 104A) or a non-uniform design as in FIG. 6 (curve 106A). These curves 104A, 106A illustrate how the photodetector responsivity can be modified by providing a target having a non-uniform design. For example, the curve 104A indicates that the design 50 of FIG. 5 can provide a slope for the photodetector responsivity that is even steeper than that of FIG. 4. On the other hand, the curve 106A indicates that the design 60 of FIG. 6 can result in a response curve for the photodetector 14 that is even more linear than that achieved by the design 40 of FIG. 3. As noted above, the acceptance angle of the photodetector 14 and the distance to the target (e.g., the backside 25 of the display screen 24)—as well as the design presented by the target—impact the amount of light sensed by the photodetector 14.

Assuming the target presents the non-uniform design of FIG. 2 or FIG. 5 to the module 10, then when the target is relatively close to the substrate 16 (e.g., when it is displaced slightly by a person pressing down on the display screen), the photodetector 14 will collect light reflected by portions of the target closer to the central white region (i.e., 32 or 52). In contrast, when the target is somewhat further away from the substrate 16, the photodetector 14 also will collect light reflected by portions of the target further from the central white region such as the grey-scale or black regions. This change will impact the signal sensed by the photodetector 14.

Likewise, assuming the target presents the non-uniform design of FIG. 3 or FIG. 6 to the module 10, then when the target is relatively close to the substrate 16 (e.g., when it is displaced slightly by a person pressing down on the display screen), the photodetector 14 will collect light reflected by portions of the target closer to the central black region (i.e., 42 or 62). In contrast, when the target is somewhat further away from the substrate 16, the photodetector 14 also will collect light reflected by portions of the target further from the central black region such as the grey-scale or white regions. This change will impact the signal sensed by the photodetector 14.

The signal(s) sensed by the photodetector 14 can be read out and processed by circuitry 28 (FIG. 1) either in the module 10 itself or in the host device in which the module is disposed. The circuitry 28 can be implemented, for example, as an integrated circuit chip or other processor and may include software and/or a look-up table stored in memory that allows the circuitry 28 to correlate the measured photodetector signal to a distance. The correlation can be based, for example on an experimentally derived mathematical formula or on data stored in a look-up table. The circuitry 28 also facilitates control (e.g., turning on/off) of the light source 12.

In the foregoing examples of FIGS. 2, 3, 5 and 6, the design presented by the target has a circular black or white region at the center of the design. This feature can be advantageous, for example, for implementations in which the cross-section of the light beam produced by the light source 12 is substantially circular. Non-uniform designs composed of differently shaped black and white regions (and, in some cases, also grey-scale regions) may be appropriate for other implementations. Further, the overall size of the design presented to the photodetector by the target or the size of the different black, white or grey-scale regions can differ from those illustrated in FIGS. 2, 3, 5 and 6.

Figure 8:
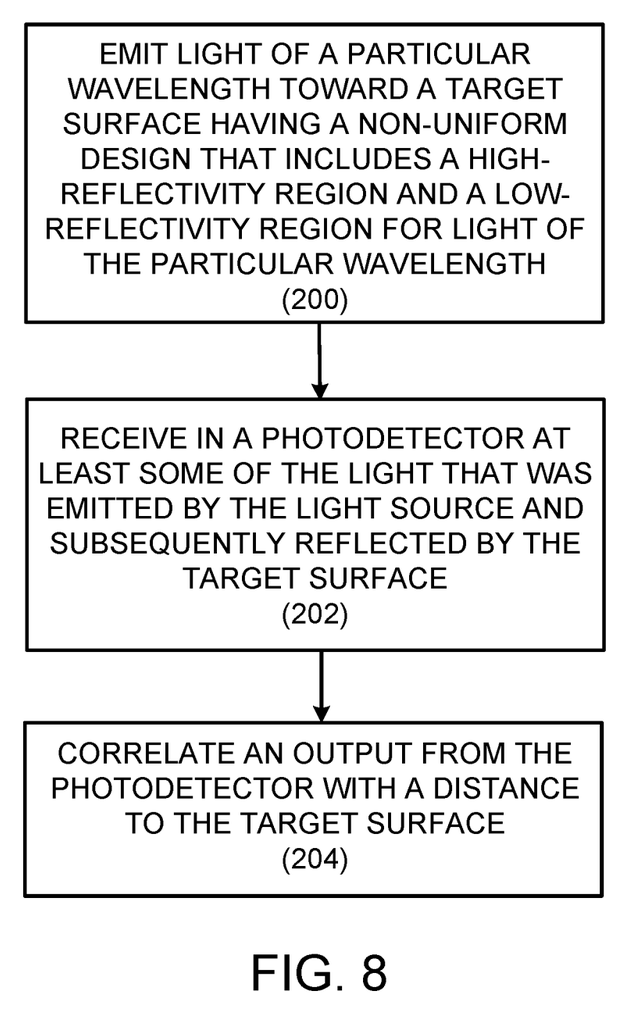
FIG. 8 is a flow chart of a method according to the present disclosure.

In operation, as indicated by FIG. 8, light of a particular wavelength is emitted toward a target surface having a non-uniform design that includes a high-reflectivity region and a low-reflectivity region for light of the particular wavelength (200). At least some of the light that was emitted by the light source and subsequently reflected by the target surface is received in the photodetector 14 (202). An output from the photodetector then is correlated with a distance to the target surface (204).

A particular example of an application for the proximity sensor module 10 is for sensing the displacement of an interactive touch interface (e.g., display screen) of a portable or other computing device (e.g., a smartphone, tablet, wearable device, PDA, or personal computer). The techniques described here, however, also can be used in other applications that involve detecting the distance to a displaceable element. Thus, for example, the present techniques can be used to monitor a MEMs membrane in an audio speaker, which then can be tuned to correct for frequency distortions. The present techniques also can be used in a feedback loop to provide autofocus based on the displacement of a lens assembly in a camera module.

Various aspects of the subject matter and the functional operations described in this specification (e.g., those relating to the circuitry 28) can be implemented in digital electronic circuitry, or in computer software, firmware, or hardware, or in combinations of them. Some features of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A number of implementations have been described. Nevertheless, various modifications may be made without departing from the spirit and scope of the invention. Accordingly, other implementations are within the scope of the claims.

The invention claimed is:

1. An apparatus comprising:
   a target surface having a non-uniform design including a high-reflectivity region and a low-reflectivity region for light of a particular wavelength, wherein a position of the target surface is displaceable within the apparatus;
   a light source operable to emit light at the particular wavelength toward the target surface;
   a photodetector operable to sense at least some of the light emitted by the light source and subsequently reflected by the target surface; and
   a processor operable to correlate an output from the photodetector with a distance to the target surface;
   wherein a response curve of the photodetector, for different distances to the target surface, is more linear than if the target surface had a uniform high- or low-reflectivity across the entirety of the target surface.

2. The apparatus of claim 1 wherein the high-reflectivity region has a reflectivity R>90%, and wherein the low-reflectivity region has a reflectivity R<10%.

3. The apparatus of claim 1 wherein the high-reflectivity region is white, and wherein the low-reflectivity region is black.

4. The apparatus of claim 1, wherein the high-reflectivity region is at a center of the non-uniform design, the high-reflectivity region being surrounded by the low-reflectivity region.

5. The apparatus of claim 1, wherein the low-reflectivity region is at a center of the design, the low-reflectivity region being surrounded by the high-reflectivity region.

6. The apparatus of claim 1 wherein a response curve of the photodetector, for different distances to the target surface, has a steeper slope than if the target surface had a uniform high- or low-reflectivity across an entirety of the target surface.

7. The apparatus of claim 1 wherein the at least one grey-scale region has a reflectivity 10%<R<90%.

8. The apparatus of claim 1 wherein the high-reflectivity region is at a center of the non-uniform design, the high-reflectivity region being surrounded by the low-reflectivity region, and wherein the at least one grey-scale region provides a transition from the high-reflectivity region to the low-reflectivity region.

9. The apparatus of claim 1 wherein the low-reflectivity region is at a center of the non-uniform design, the low-reflectivity region being surrounded by the high-reflectivity region, and wherein the at least one grey-scale region provides a transition from the low-reflectivity region to the high-reflectivity region.

10. The apparatus of claim 1 wherein the non-uniform design is symmetrical about a center line, and wherein the light source and the photodetector are symmetrically disposed with respect to the center line.

11. The apparatus of claim 1 wherein an amount of light sensed by the photodetector depends on an amount of displacement of the target surface.

12. The apparatus of claim 1 wherein the target surface is a backside of a touch interactive display screen.

13. The apparatus of claim 1, wherein the design includes at least one grey-scale region.

14. A method comprising:
   emitting, by a light source, light of a particular wavelength toward a target surface having a non-uniform design that includes a high-reflectivity region and a low-reflectivity region for light of the particular wavelength;
   receiving in a photodetector at least some of the light that was emitted by the light source and subsequently reflected by the target surface; and
   correlating an output from the photodetector with a distance to the target surface;
   wherein a response curve of the photodetector, for different distances to the target surface, is more linear than if the target surface had a uniform high- or low-reflectivity across the entirety of the target surface.

15. The method of claim 14 including repeating the emitting, receiving and correlating after the target surface is displaced from an initial position.

16. A host device comprising:
   a touch interactive display screen having a backside surface that has a non-uniform design including a high-reflectivity region and a low-reflectivity region for light of a particular wavelength, wherein a position of the backside surface is displaceable within the host device;
   a light source operable to emit light at the particular wavelength toward the backside surface;
   a photodetector operable to sense at least some of the light emitted by the light source and subsequently reflected by the backside surface; and
   a processor operable to correlate an output from the photodetector with a distance to the backside surface;
   wherein a response curve of the photodetector, for different distances to the target surface, is more linear than if the target surface had a uniform high- or low-reflectivity across the entirety of the target surface.

17. The host device of claim 16 wherein the touch interactive display screen is part of a smartphone.

\* \* \* \* \*